W. L. BURNER & J. D. BENBOW.
DUMP CAR.
APPLICATION FILED JAN. 8, 1917.
1,248,411.
Patented Nov. 27, 1917.
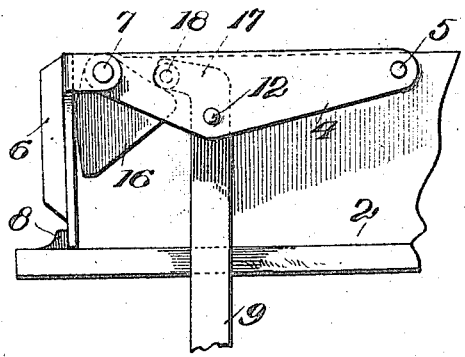
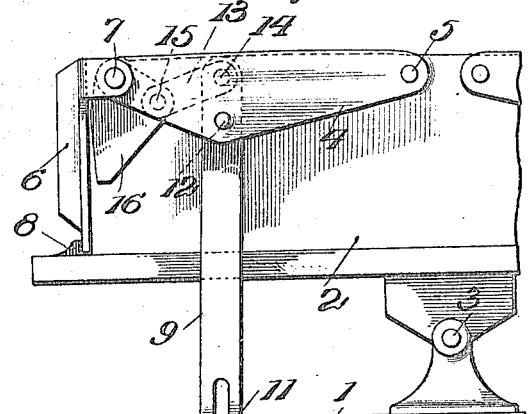
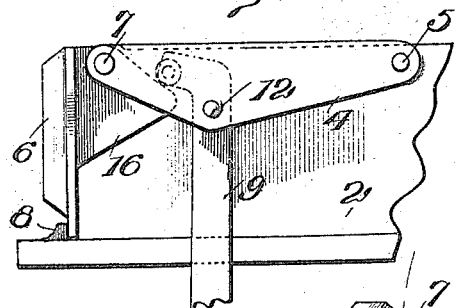
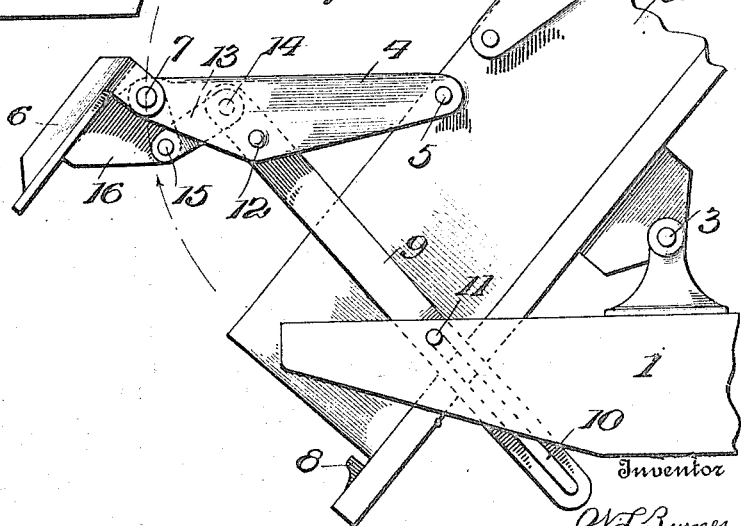
Witness
J. W. Kirker
Robt. E. Love
Inventor
W. L. Burner
J. D. Benbow

UNITED STATES PATENT OFFICE.

WILLIAM L. BURNER AND JAMES D. BENBOW, OF COLUMBUS, OHIO, ASSIGNORS TO THE KILBOURNE AND JACOBS MANUFACTURING COMPANY, OF COLUMBUS, OHIO.

DUMP-CAR.

1,248,411.    Specification of Letters Patent.    Patented Nov. 27, 1917.

Application filed January 8, 1917. Serial No. 141,251.

*To all whom it may concern:*

Be it known that we, WILLIAM L. BURNER and JAMES D. BENBOW, citizens of the United States of America, residing at Columbus, in the county of Franklin and State of Ohio, have invented certain new and useful Improvements in Dump-Cars, of which the following is a specification.

Our invention relates to devices for dumping a car bed pivotally mounted, preferably a side dumping car of the type in which, during the dumping operation, the side door is held aloft and swings outwardly on the side at which the lading is discharged, while the door on the opposite side of the car bed retains its closed position. The chief feature of the invention is the use of a vertically disposed lifting bar to hold the door aloft and one or more pivotally mounted members interposed between the door and the lifting bar in such way as to be actuated by the bar to swing the door to its desired open position during the dumping operation and to effect its retraction when the car is being restored to normal position.

In the drawings hereto attached and hereby made a part of this specification, Figure 1 shows our devices in place on the end of a car, a portion only of the car being illustrated.

Fig. 2 shows the devices when the car is at its maximum dumping position.

Fig. 3 shows a modification in which the vertical lifting bar engages the door actuating member directly, while Fig. 4 shows the connections set out in Fig. 3 except that the member with which the lifting bar engages is secured rigidly upon the door.

In Figs. 3 and 4 a roller member has been introduced.

Referring to the drawings, 1 is a car underframe, 2 is the car bed pivotally mounted at 3, 4 is the door supporting bar pivoted to the car bed at 5, and the door 6 is pivotally mounted thereon at 7 to swing outwardly and is locked in closed position by the stop 8. The lifting bar 9 is slotted at 10 and receives the guide pin 11 on the car underframe.

The lifting bar 9 is pivoted near its upper end at 12 to the door supporting bar 4, and carries at its upper end pivotally mounted at 14 the link 13, which is also pivotally connected at 15 with a door actuating member 16 pivotally mounted on the door supporting bar 4 at 7, the same point at which the door is hung on the said bar 4.

The operation of the device is as follows:—

Assume that the car bed is to be dumped toward the left, as illustrated in Fig. 2, the bar 9 is lowered through the tilting of the car bed until the pin 11 engages the upper end of the slot 10 whereupon the door is held aloft, and as the travel of the car bed carries the bar 9 through an arc the link 13 by means of the pivotal connection 14 actuates the member 16 through the pivotal connection 15 to engage the door, and on account of the shape of the member 16 the door is rotated to an outward open position and maintained there until the car bed is again being restored to normal position.

The general shape of the member 16 is triangular, with one side thereof adapted to engage the door to swing it, and the member 16 is pivoted at the upper angle thereof adjacent to the door whereas the actuation thereof takes place through the pivotal connection 15 at the other upper angle thereof. We thus utilize a free-swinging member appropriately pivoted for actuation by the door supporting member, to throw the door to its desired open position.

A modification is shown in Fig. 3, wherein the link 13 is omitted and its function is performed by providing a hook 17 at the upper end of the door lifting bar 9 provided with a roller 18 which engages the member 16 and actuates the same directly.

In Fig. 4 the member 16 is secured rigidly on the door, and is actuated by the hook and roller construction shown in Fig. 3.

Upon returning the car bed to normal position the member 16 is swung on the pivot 7 through the pivotal connection at 15 with the link 13, and the door 6 drops back gradually to its normal position behind the lock 8. The member 16 may appropriately be described as a cam member swinging about the pivot 7 and actuated by a force acting on the pivot point 15.

What we claim is:—

1. In a car having a bed pivotally mounted for dumping a door supporting member pivotally mounted on said bed, a door pivotally carried on said member, a lifting member pivotally carried on the frame of said car and pivotally connected with said supporting member, a cam member pivotally mounted on said supporting member to engage said door, and a link pivotally associated with said lifting member and said cam member to cause said cam member to swing said door outwardly as the car bed is being dumped.

2. In a dump car having a pivotally mounted car bed and a supporting member, a door pivotally mounted thereon, a lifting member pivotally connected with said supporting member, and cam means interposed between said door and said lifting member and adapted to be actuated through said lifting member to swing said door to open position as the car bed is tilted.

3. In a dump car having a bed pivoted for dumping, and a pivoted supporting member thereon and a door pivoted to said member, a lifting member pivotally mounted on said car and pivotally connected with said supporting member, a cam member pivotally interposed between said door and said lifting member, and means associated with said lifting member adapted to actuate said cam member to swing said door to an open position as the said car bed is dumped.

In testimony whereof we affix our signatures in the presence of two witnesses.

WILLIAM L. BURNER.
JAMES D. BENBOW.

Witnesses:
J. W. KIRKER,
S. A. GARDINER.

Copies of this patent may be obtained for five cents each, by addressing the "Commissioner of Patents, Washington, D. C."